(12) United States Patent
Barthes et al.

(10) Patent No.: US 11,383,761 B2
(45) Date of Patent: Jul. 12, 2022

(54) USE OF A DYNAMIC SATURATION FUNCTION WHEN RETURNING A STEERING WHEEL TO ITS CENTRAL POSITION, SO AS TO ELIMINATE UNDESIRABLE VISCOUS EFFECTS

(71) Applicant: JTEKT EUROPE, Irigny (FR)

(72) Inventors: Dimitri Barthes, Lyons (FR); Pascal Moulaire, La Tour de Salvagny (FR); Julien Ponte, Lyons (FR)

(73) Assignee: JTEKT EUROPE, Irigny (FR)

( * ) Notice: Subject to any disclaimer, the term of this patent is extended or adjusted under 35 U.S.C. 154(b) by 22 days.

(21) Appl. No.: 16/961,166

(22) PCT Filed: Jan. 4, 2019

(86) PCT No.: PCT/FR2019/050014
§ 371 (c)(1),
(2) Date: Jul. 9, 2020

(87) PCT Pub. No.: WO2019/138174
PCT Pub. Date: Jul. 18, 2019

(65) Prior Publication Data
US 2020/0361527 A1 Nov. 19, 2020

(30) Foreign Application Priority Data
Jan. 9, 2018 (FR) .................................... 18/50171

(51) Int. Cl.
*B62D 5/04* (2006.01)
*B62D 6/00* (2006.01)
(52) U.S. Cl.
CPC ........... *B62D 5/0466* (2013.01); *B62D 6/008* (2013.01)

(58) Field of Classification Search
CPC ............................. B62D 5/0466; B62D 6/008
(Continued)

(56) References Cited

U.S. PATENT DOCUMENTS 9,738,308 B2 * 8/2017 Ueyama ............... B62D 5/0463
9,796,413 B2 * 10/2017 Kitazume ................ B62D 6/00
(Continued)

OTHER PUBLICATIONS

Feb. 26, 2019 Search Report issued in International Patent Application No. PCT/FR2019/050014.

*Primary Examiner* — Scott A Reinbold
(74) *Attorney, Agent, or Firm* — Oliff PLC (57) ABSTRACT

A power steering system including a steering wheel, a return function to automatically return the steering wheel to a given reference position, and includes a function for calculating a return-speed setpoint which calculates a steering wheel speed setpoint from the steering wheel position error differentiating between the effective instantaneous position of the steering wheel and the reference position, then a function for calculating the return assistance, defining from the steering wheel speed error which is the difference between the effective speed of the steering wheel and the steering wheel speed setpoint, a return assistance setpoint, the system including a dynamic saturation function defining at least one saturation threshold, that the dynamic saturation function sets according to the value of the steering wheel speed setpoint, and the dynamic saturation function applies to clip the peaks of the return assistance setpoint calculation to confine the return assistance setpoint to an authorized domain.

10 Claims, 3 Drawing Sheets

(58) Field of Classification Search
USPC .......................................................... 701/41
See application file for complete search history.

(56) References Cited

U.S. PATENT DOCUMENTS

| | | | |
|---|---|---|---|
| 10,556,619 B2* | 2/2020 | Aoki | B62D 5/0466 |
| 2016/0001811 A1 | 1/2016 | Endo et al. | |
| 2017/0066472 A1 | 3/2017 | Wang et al. | |
| 2018/0065659 A1* | 3/2018 | Aoki | B62D 5/0463 |

* cited by examiner

USE OF A DYNAMIC SATURATION FUNCTION WHEN RETURNING A STEERING WHEEL TO ITS CENTRAL POSITION, SO AS TO ELIMINATE UNDESIRABLE VISCOUS EFFECTS

The present invention concerns the power steering systems which comprise a return function in the center of the steering wheel.

Such a return function, in a manner known per se, uses the assist motor to return the steering wheel to a neutral central position, which corresponds to a straight-line trajectory, after the steering wheel has been turned, then generally released, by the driver to take a turning.

As such, it is in particular known to use a return function which carries out a servo-control of the speed of rotation of the steering wheel.

Such a return function determines, depending on the deviation which separates the actual angular position of the steering wheel from the central position of the steering wheel, a steering wheel speed setpoint which aims at returning the steering wheel to the central position, and consequently adjusting the setpoint applied to the assist motor so as to give the steering wheel the desired angular speed.

However, the inventors have discovered that the implementation of such return functions could have some drawbacks.

Indeed, during certain maneuvers during which the driver starts to steer sharply, that is to say starts to turn the steering wheel significantly in a first direction, then quickly counter-steers, that is to say then quickly brings the steering wheel into the central position, as is the case for example when changing direction at an intersection (a situation called «street corner») or else when taking a sharp turning (of the hairpin type), it may happen that the driver manually gives the steering wheel, when he brings said steering wheel to the central position, an actual speed of rotation which is greater than the steering wheel speed setpoint defined by the return function.

In such cases, the return function then tends to dampen the return, by braking the steering wheel against the manual operation.

This damping behavior of the return is a source, for the driver, of artificial driving sensations, which does not correspond to what the driver expects to feel in such a situation.

Similarly, the known return functions sometimes tend to create, when the driver turns the steering wheel in a direction which moves the steering wheel away from its central position, that is to say when the driver accentuates the steering system steering angle, a viscous behavior which is opposed to the rotation of the steering wheel, and which is all the more perceptible, and therefore uncomfortable, as the speed of rotation, given to said steering wheel by the driver, is high.

The objects assigned to the invention consequently aim at overcoming the aforementioned drawbacks and at proposing a new power steering system which ensures an effective return of the steering wheel to the central position while not causing a viscous disturbance during maneuvers of the steering wheel.

The objects assigned to the invention are achieved by means of a power steering system comprising a steering wheel, as well as a return function which is designed to automatically return said steering wheel to a given reference position, for example a central position, when the steering wheel is in a position distinct from said reference position, said return function comprising for this purpose a return speed setpoint calculation function which calculates a steering wheel speed setpoint, from the deviation, called «steering wheel position error», between the instantaneous actual position of the steering wheel and the reference position, then a return assist calculation function which defines, from the deviation, called «steering wheel speed error», between the actual speed of the steering wheel and said steering wheel speed setpoint, a setpoint called «return assist setpoint» which is intended to control an assist motor to converge the actual speed of the steering wheel to the steering wheel speed setpoint, said system being characterized in that it comprises a dynamic saturation function which defines at least one saturation threshold, that said dynamic saturation function adjusts depending on the value of the steering wheel speed setpoint, then that said dynamic saturation function applies for clipping the calculation carried out by the return assist calculation function, so as to contain the return assist setpoint in a domain called «authorized return assist domain», whose extent is correlated to the value of the steering wheel speed setpoint.

Advantageously, the dynamic saturation function according to the invention allows defining a saturation threshold which varies to be adapted, in real time, to the maneuvering situation of the vehicle, depending on whether the steering wheel is in the position turned to the left or on the contrary to the right relative to the reference position thereof, depending on whether the driver carries out a steering to accentuate moving the steering wheel away from its driving position or, on the contrary, a counter-steering to bring the steering wheel closer to its reference position, and finally according to the speed, typically according to the angular speed of rotation, at which the driver displaces the steering wheel to perform his maneuver.

In this manner, the dynamically adapted saturation threshold allows clipping, at any time, some components, called «undesirable components», which may be present either in the steering wheel speed error signal, at the input of the return assist calculation function, or in the return assist setpoint signal, at the output of said return assist calculation function, and which correspond, when expressed in the return assist setpoint, to artificial viscous components, which distort the feeling of the driver and degrade the driving comfort.

Advantageously, the dynamic saturation function according to the invention allows removing these undesirable components, and only these undesirable components, in order to keep, in the return assist setpoint finally applied to the assist motor, only the «pure» return component adapted to the maneuvering situation in progress.

By providing a dynamic saturation which allows distinguishing, at all times, between the different steering wheel maneuvering situations, and quantifying, in each situation, what is the part of the return assist setpoint which corresponds to a desired «pure» return component, and what is the part of the return assist setpoint which corresponds to an undesirable viscous component induced by the return function, such that said dynamic saturation function thus allows directly calculating, or extracting from the return assist setpoint calculated by the return assist calculation function, a saturated return assist setpoint which keeps only the «pure» useful return component, the invention allows refining the operation of the return function, and therefore improving the driving comfort, by providing the driver with a feeling of the return which is more faithful to the maneuvering situation, regardless of this maneuvering situation, and which is therefore more intuitive.

Other objects, features and advantages of the invention will appear in more detail on reading the following description as well as using the appended drawings, provided for purely illustrative and non-limiting purposes, among which.

The present invention concerns a power steering system 1, intended to equip a vehicle.

In a manner known per se, such a power steering system 1 comprises a steering wheel 2.

This steering wheel 2 is arranged such that the driver can change the position P_sw of said steering wheel 2 to maneuver the power steering system 1, in order to define the heading of the vehicle.

Of course, said steering wheel 2 could take any appropriate form, for example the conventional form of a hoop movable in rotation, or even that of a joystick movable for example in tilting.

It should be noted that, preferably, the steering wheel 2 is designed to be actuated in rotation by the driver, such that reference will preferably be made to an angular position, and to an angular speed, of said steering wheel 2.

However, the invention is perfectly applicable to a steering wheel 2 which would be constituted by a linear control member, movable in translation rather than in rotation, in which case, a linear position and a linear speed of said steering wheel, would be considered, mutatis mutandis, without departing from the scope of the invention.

The power steering system 1 further comprises, in a manner known per se, a steering mechanism, preferably a rack and pinion steering mechanism, whose displacement is controlled by the steering wheel 2 and allows changing the steering angle, that is to say the yaw orientation, of a steered wheel, or preferably of several steered wheels, of the vehicle.

The power steering system 1 also includes a return function, noted REC, for «REturnability Control», which is designed to automatically return said driving wheel 2 at a given reference position P0, for example a central position P0, when the driving wheel 2 is in a position P_sw distinct from said reference position (that is to say when P_sw≠P0).

Preferably, the reference position P0 of the steering wheel will correspond to the central position of the steering mechanism (and therefore of the power steering system 1), corresponding to a trajectory of the vehicle in straight line.

In this case, the reference position P0 will be associated, by convention, to a zero angular position of the steering wheel 2, which defines the origin of the coordinate system relative to which the steering wheel moves either to the left or to the right, that is to say that one will have P0=0.

However, as a variant, a reference position P0 corresponding to a non-zero steering angle, that is to say to a turned position of the steering wheel 2, could be defined. This could in particular be the case if the reference position P0 is adjusted by a third-party automatic piloting function, for example a function for automatically tracking a traffic lane (called «lane keeping»), when said automatic piloting function makes the vehicle follow a curved trajectory, corresponding to a non-zero reference position P0, rather than a straight trajectory corresponding to a zero reference position P0.

Moreover, it should be noted that the information representative of the position of the steering wheel P_sw can be provided by any appropriate means, for example by a position sensor placed on the steering column which carries the steering wheel 2, or else by a position sensor placed on any other portion of the steering mechanism whose position is representative of the position P_sw of the steering wheel 2, which is in particular the case if said mechanism is linked to the steering wheel 2 by movement transmission elements.

Thus, in particular, it will be possible, for example, to evaluate the position of the steering wheel P-sw from position information of the motor shaft of the assist motor 3 which drives the rack and the steering wheel 2.

If necessary, any suitable algorithm can be used to estimate the angular position of the steering wheel P_sw from data acquired by the power steering system 1, or accessible to said power steering system 1.

The return function REC advantageously carries out a servo-control of the steering wheel speed V_sw, which allows returning the steering wheel 2 to the reference position P0 thereof, by making the steering wheel 2 follow a determined rotation speed profile, which is defined by a steering wheel speed setpoint V_sw_set which depends in particular on the position P_sw of said steering wheel at the instant considered.

Figure 1:
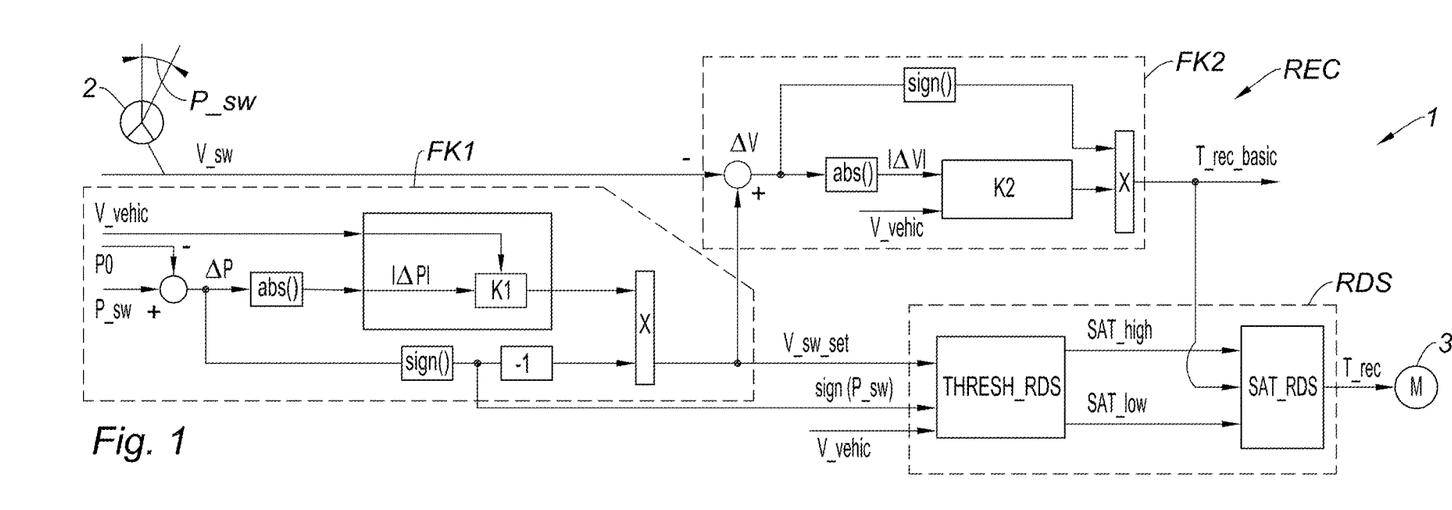
FIG. 1 illustrates, according to a block diagram, a first example of a power steering system equipped with a return function and a dynamic saturation function according to the invention, within which the dynamic saturation function acts at the output of the return assist calculation function, so as to clip a return assist setpoint previously calculated by said return assist calculation function.
Figure 7:
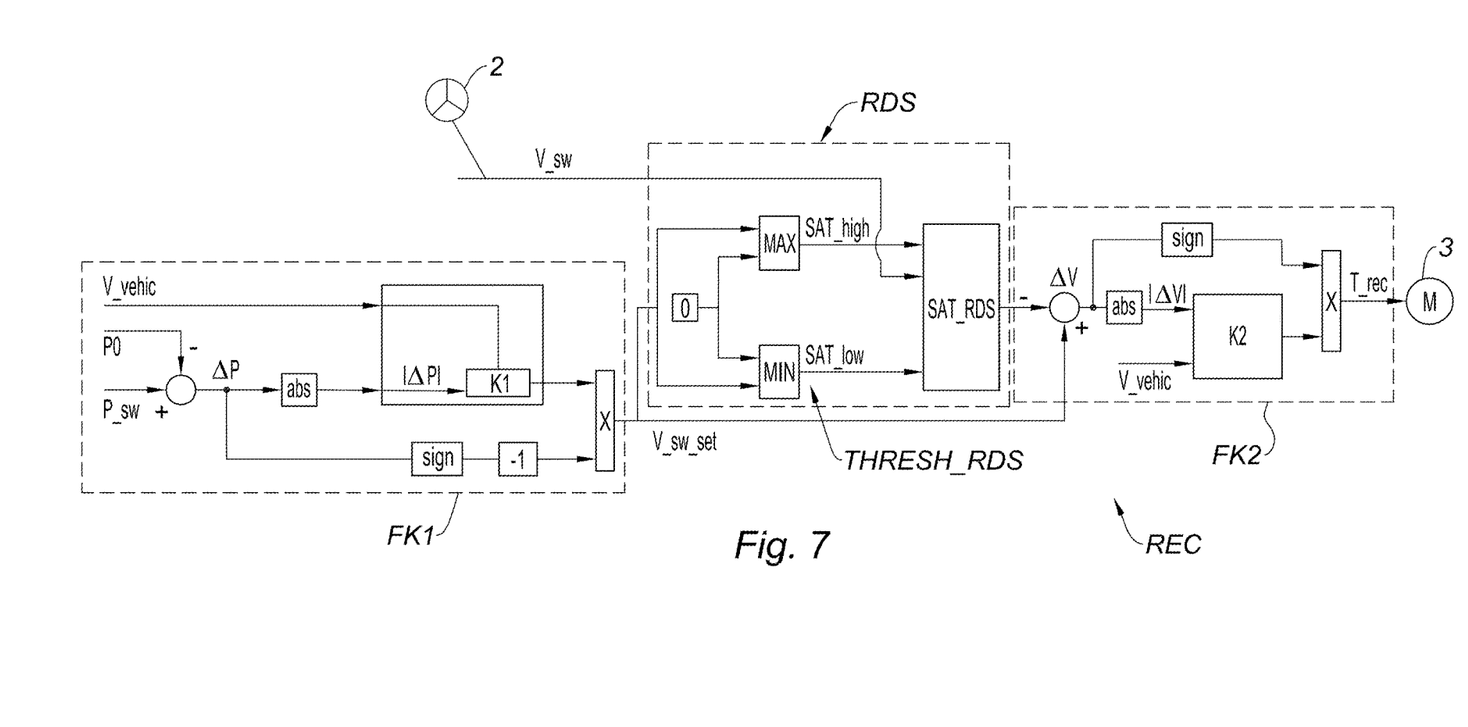
FIG. 7 illustrates, according to a block diagram, a second example of a power steering system equipped with a return function and a dynamic saturation function according to the invention, within which the dynamic saturation function acts at the input of the return assist calculation function, so as to clip the steering wheel speed error which is then taken into consideration to calculate the return assist setpoint.

As such, and as illustrated in FIG. 1, or in FIG. 7, said return function REC comprises a function, denoted FK1, for calculating a return speed setpoint, which first calculates a steering wheel speed setpoint V_sw_set, from the deviation, called «steering wheel position error» ΔP, between the instantaneous actual position of the steering wheel P_sw and the reference position (P0).

One thus have:

$$\Delta P = P\_sw - P0;$$

$$V\_sw\_set = FK1(\Delta P)$$

And more particularly $$V\_sw\_set = FK1(\Delta P) = K1(abs(\Delta P)) * [sign(\Delta P) * (-1)]$$

where

«abs» designates the mathematical function «absolute value»”

«Sign» designates the mathematical function «sign», which returns +1 if the tested expression is positive, −1 if the tested expression is negative and where K1 represents here a first law (or «function») of predetermined conversion which allows the return speed setpoint calculation function FK1 to associate to each steering wheel position error (absolute) value ΔP an appropriate steering wheel speed setpoint V_sw_set.

Said gain applied by said first conversion law K1 is preferably adjusted depending on the vehicle longitudinal speed V_vehic, preferably according to a decreasing function of said vehicle speed V_vehic, the gain applied by the first conversion law K1 thus decreasing, in absolute value, when the vehicle accelerates.

Said gain applied by the first conversion law K1 preferably varies depending on the position of the steering wheel P_sw, and more particularly depending on the value of the steering wheel position error ΔP.

More preferably, the gain applied by the first conversion law K1 will increase, in absolute value, with the position error ΔP (respectively with the position of the steering wheel P_sw), according to an increasing function of said position error ΔP (respectively from said position P_sw), that is to say that the gain applied by the first conversion law K1 will increase, in absolute value, as the steering wheel 2 moves away from the reference position P0 thereof.

The first conversion law K1 might take the form of a map, for example a three-dimensional map, herein preferably a map expressing the gain applicable depending on the vehicle speed V_vehic and the position P_sw of the steering wheel.

This map could be stored in a non-volatile memory of the power steering system 1.

In practice, if P0=0, one will have ΔP=P_sw.

For convenience of description, the position of the steering wheel P_sw could therefore be possibly assimilated, in the following, to the steering wheel position error at ΔP Moreover, by sign convention, it will be considered herein that the position of the steering wheel P_sw is positive when the steering wheel is turned to the right relative to the reference position P0, and negative when the steering wheel is turned to the left relative to said reference position P0. Of course, a contrary convention could be adopted without departing from the scope of the invention.

Similarly, it will be considered that the speed of the steering wheel V_sw is positive when the steering wheel is displaced from left to right (clockwise), and negative when the steering wheel is displaced from right to left (counterclockwise).

Of course, to ensure the return of the steering wheel to the reference position P0, the steering wheel speed setpoint V_sw_set should be of opposite sign to the sign of the position P_sw of the steering wheel (and more particularly to the sign of the steering wheel position error ΔP).

This explains why, in the diagrams of FIGS. 1 and 7 and in the formula above, an absolute value of the steering wheel position error ΔP as well as a sign correction factor of type [sign(ΔP)*(−1)], are used, strictly, by considering the algebraic values (with sign) of the different magnitudes, when calculating the steering wheel speed setpoint V_sw_set:

$$\Delta P = P\_sw - P0$$

$$V\_sw\_set = FK1(\Delta P) = K1(abs(\Delta P)) * [sign(\Delta P)*(-1)]$$

Of course, any other formulation or modeling which would be equivalent in its effects, could be used without departing from the scope of the invention.

The return function (REC) also comprises a return assist calculation function FK2 which then defines, from the deviation, called «steering wheel speed error» ΔV, between the actual speed of the steering wheel V_sw and said steering wheel speed setpoint V_sw_set, a setpoint called «return assist setpoint» T_rec which is intended to control an assist motor 3 to converge the actual speed of the steering wheel V_sw to the steering wheel speed setpoint V_sw_set.

$$\Delta V = V\_sw\_set - V\_sw$$

$$T\_rec = FK2(\Delta V)$$

And more particularly $T\_rec = FK2(\Delta V) = K2(abs(\Delta V)) * sign(\Delta V)$ K2 represents herein a second law (or «function») of predetermined conversion which allows the return assist calculation function FK2 to associate, to each steering wheel speed error (absolute) value ΔV, an appropriate return assist setpoint value T_rec.

Preferably, said return assist setpoint T_rec is homogeneous at a force, and more particularly with a torque, that the assist motor 3 should apply to change the actual speed of the steering wheel V_sw and get said actual steering wheel speed V_sw closer to the steering wheel speed setpoint V_sw_set.

Said return assist setpoint T_rec therefore represents more preferably the power supply current which it is desired to be applied to the assist motor 3 so that the latter delivers the desired return force (or torque).

The gain applied by the second conversion law K2 is preferably adjusted depending on the longitudinal speed of the vehicle V_vehic.

Said gain applied by the second conversion law K2 varies preferably depending on the value of the steering wheel speed error ΔV.

More preferably, the gain applied by the second conversion law K2 will increase, in absolute value, with the steering wheel speed error ΔV, as an increasing function of said speed error ΔV, that is to stay that the more the actual steering wheel speed V_sw will be away from the steering wheel speed setpoint V_sw_set, the more the gain applied by the second conversion law K2 will increase, in absolute value, so as to promote a quick convergence The second conversion law K2 might take the form of a (second) map, for example a three-dimensional map, herein preferably a map expressing the gain applicable depending on the vehicle speed V_vehic and the steering wheel speed error ΔV.

Said map could be stored in a non-volatile memory of the power steering system 1.

The assist motor 3 is understood herein as a motor 3, preferably a rotary motor, and preferably an electric motor, such as a brushless motor, which is capable of acting on the steering wheel 2, if necessary via the steering mechanism, to change the speed of displacement V_sw of the steering wheel 2.

If the power steering system 1 comprises a steering mechanism mechanically linked to the steering wheel 2, for example when the steering rack is driven by a pinion fastened on the steering column driven by the steering wheel, then the motor 3 can advantageously correspond to the assist motor 3 used to facilitate the maneuvers of the steering mechanism.

However, if the power steering system is a system called «steer by wire» system, within which there is no movement transmission mechanical link between the steering wheel 2, on the one hand, and the steering mechanism (rack, steering tie rods, wheels), on the other hand, then there will preferably be a main motor intended to drive the steering mechanism (and therefore to change the yaw orientation of the wheels), which will be activated so that said main motor displaces the wheels at a speed corresponding to the target steering wheel speed setpoint V_sw_set, while an auxiliary «feedback» motor, specifically assigned to the steering wheel to restore the position and behavior of the steering mechanism to the steering wheel, as well as the sensations provided by the road, will act on the steering wheel 2 as a «follower» of the steering mechanism and the main motor, and will thus tend to impart, to said steering wheel 2, a speed V_sw which will converge towards the applicable steering wheel speed setpoint V_sw_set.

Figure 4:
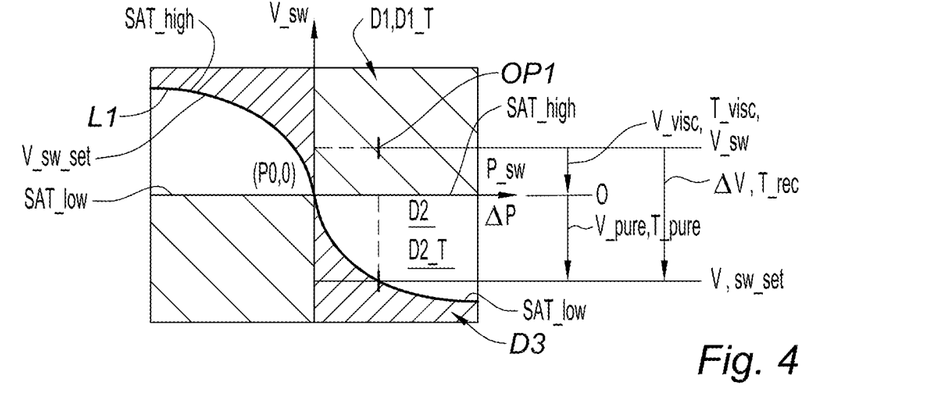
FIGS. 4, 5 and 6 illustrate, on a four quadrant diagram representing, on the abscissa, the position of the steering wheel and, on the ordinate, the actual speed of the steering wheel, the operating principle of the invention which operates a saturation relative to an authorized domain comprised between zero and the curve representative of the steering wheel speed setpoint, respectively in a steering situation, in a slow counter-steering situation, and in a quick counter-steering situation.
Figure 5:
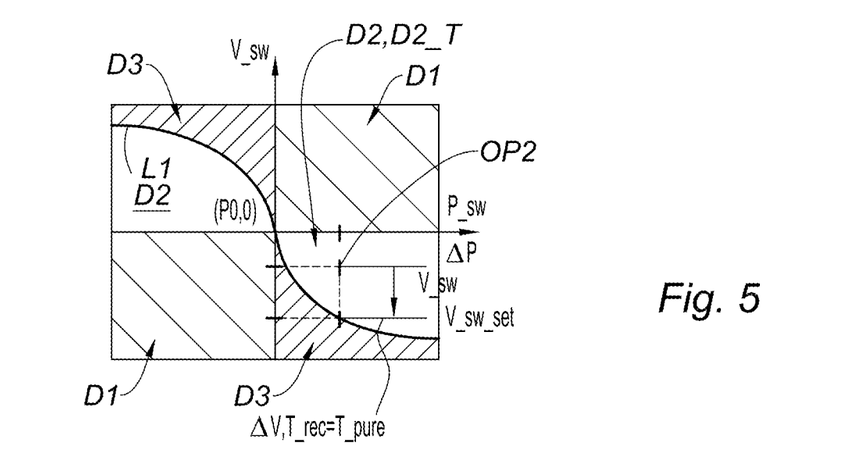
Figure 6:
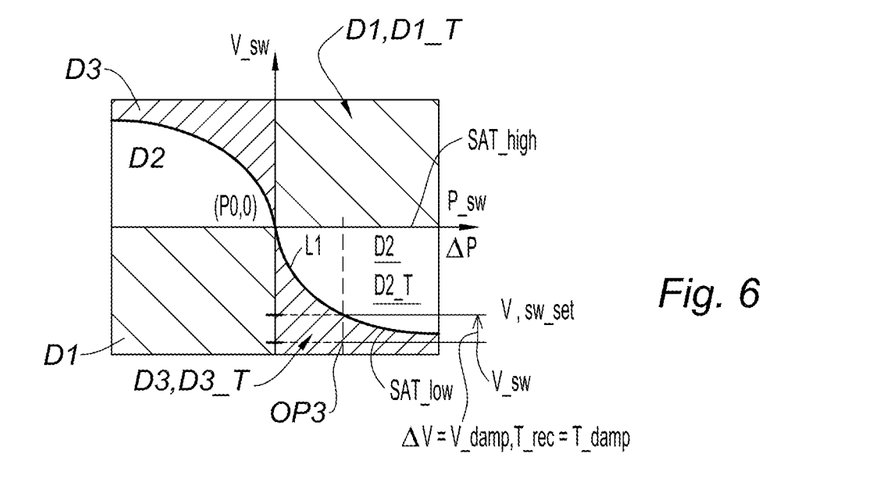

For a good understanding of the invention, we will present the different concerned maneuvering situations by means of four quadrant diagrams illustrated in FIGS. 4, 5 and 6.

These diagrams show, on the abscissa, the position of the steering wheel (or «steering wheel angle») P_sw at the instant considered, and more specifically the steering wheel position error ΔP, that is to say the deviation between the actual position of the steering wheel P_sw and the reference position P0.

On the ordinate, they present the speed of the steering wheel V_sw.

The origin of the coordinate system corresponds to the coordinate point (P0, 0), that is to say of an abscissa corresponding to the reference position P0 (which is preferably zero), and of ordinate corresponding to a zero steering wheel speed (V_sw=0).

The curve L1 corresponding to the steering wheel speed setpoint V_sw_set is also represented on this coordinate system, as it results from the application of the first conversion law K1, and more generally as it results from the return speed setpoint calculation function FK1.

It should be noted that the curve L1 representative of the return speed setpoint calculation function FK1 preferably has a curved shape, in S, with a steep slope from the reference position P0, then a slope which is gradually attenuating as the steering wheel 2 moves away from the reference position P0, that is to say as the position error ΔP increases (in absolute value), to converge to an asymptote, preferably strictly monotonous.

The shape of the curve L1 (and therefore of the corresponding function FK1) will however remain adjustable depending on the vehicle and the configuration of the power steering system 1.

It should also be noted that said speed setpoint curve L1, and more generally the four quadrant diagram, is centered on, and symmetrical relative to the origin of the coordinate system (P0, 0), so as to manage, in a similar manner, both situations where the steering wheel 2 is turned to the right relative to the reference position P0 (half-plane corresponding to positive abscissa) and the situations where the steering wheel is turned to the left relative to the reference position P0 (half-plane corresponding to negative abscissa).

By simple description convenience, reference will be made hereinafter to a situation in which the steering wheel 2 is turned to the right, and in which the steering wheel position P_sw and the steering wheel position error ΔP are therefore positive.

The operation of the invention in the case of a steering wheel turned to the left is of course deduced mutatis mutandis.

It should also be noted that, advantageously, insofar as the return assist setpoint T_rec is the image of the steering wheel speed error ΔV by the second conversion law K2, and more generally by the return assist calculation function FK2, there is therefore a link between the representation of the steering wheel speed errors ΔV on the ordinate axis of the four quadrant diagrams and the representation that can be made of the corresponding components of the return assist setpoint T_rec.

In addition, insofar as the return assist calculation function FK2 is preferably continuous and (strictly) monotonic, and therefore bijective, the image of the curve L1 by said function FK2 preferably has a form (in S) quite similar to that of said curve L1, and will define, within the four quadrant diagram, domains of the same nature as the curve L1.

Thus, for convenience of description, one could reason on the same four quadrant diagram, as well in steering wheel speed error components, herein homogeneous at torque components, of return assist setpoint T_rec, which is the image of said steering wheel speed error by the function FK2.

For the sake of simplicity of representation, the diagrams in FIGS. 4 to 6 represent herein, on the ordinate, steering wheel speeds V_sw, and therefore allow illustrating steering wheel speed errors ΔV, which are used at the input of the return assist calculation function FK2.

Of course, the same reasoning would apply to mutatis mutandis by considering, on the ordinates, the return assist setpoint T_rec which is output from the function FK2 and which is therefore representative of the considered steering wheel speed error ΔV, as well as the constituent components of said return assist setpoint T_rec.

FIG. 4 illustrates a steering situation, that is to say a situation in which the driver moves the steering wheel 2 away from the reference position P0, herein to the right, in order to accentuate the steering angle of the power steering system 1.

This situation is identified by a first operating point denoted OP1, which is located in the north-east quadrant.

Said north-east quadrant corresponds to a first domain D1 called «steering domain» D1, in which the steering wheel position error ΔP is positive, and the speed V_sw of the steering wheel, imparted by the driver, is also positive.

The steering wheel speed error ΔV, from which the return assist setpoint T_rec is generated, therefore has an amplitude, in absolute value, which is greater than the amplitude of the steering wheel speed setpoint V_sw_set, such that this steering wheel speed setpoint V_sw_set is defined by the function FK1 in view of the considered steering wheel position P_sw (and therefore of the steering wheel position error).

Graphically, said steering wheel speed setpoint V_sw_set thus corresponds to the distance which separates, on the ordinate, the curve L1 from the abscissa axis.

Therefore one have:

$$|\Delta V| > |V\_sw\_set|$$

In order to facilitate the understanding of the principle of the invention, it will be considered that the steering wheel speed error corresponds in this turning situation to the cumulation of a component called «viscous component» V_visc, which covers the part of the speed error located in the steering domain (north-east quadrant) and of a component called «pure return component» V_pure, which extends in the south-east quadrant to the curve L1, that is to say to the steering wheel speed setpoint value V_sw_set (herein negative) which is applicable with regard to the position of the steering wheel P_sw, and more precisely with regard to the steering wheel position error ΔP, at the time considered.

It should be noted that, in the composition of the steering wheel speed error ΔV thus defined, the pure return component V_pure corresponds in fact to the steering wheel speed setpoint V_sw_set calculated by the return speed setpoint calculation function FK1: V_pure=V_sw_set, while the viscous component V_visc corresponds to an «excess» relative to said steering wheel speed setpoint V_sw_set, opposite in sign to said steering wheel speed setpoint V_sw_set.

Consequently, the return assist setpoint T_rec which is obtained by applying to this steering wheel speed error ΔV the return assist calculation function FK2 is greater, in absolute value, than the return assist setpoint which would correspond to a «pure» return action:

$$T\_pure=FK2(\Delta V=V\_sw\_set),$$

which would be obtained by applying said return assist calculation function FK2 to a steering wheel speed error which would be equal to the maximum provided by the return speed setpoint calculation function FK1, that is to say equal to the steering wheel speed setpoint V_sw_set.

Indeed:

If one sets $|\Delta V|=\|V\_pure+V\_visc|,$ with V_pure=V_sw_set, a pure return component, and V_visc, a viscous component in excess relative to V_sw_set, So $|\Delta V|=|V\_sw\_set+V\_visc|>sw\_set|$ Therefore $FK2(|\Delta V|)=FK2(|V\_sw\_set+V\_visc|)>FK2(|V\_sw\_set|)$ i.e. $T\_rec=FK2(|\Delta V|)>FK2(|\Delta V\_sw\_set|)$ There is therefore an excess value X such that:

$$T\_rec=FK2(|\Delta V\_sw\_set|)+X$$

that is to say:

$$T\_rec=T\_pure+X$$

Knowing that FK2 (|ΔV_sw_set|) represents the maximum return effort (maximum return torque) which would correspond to a pure return action, denoted T_pure, with regard to the position P_sw of the steering wheel, this means that the excess X corresponds to an undesirable viscous component, which is induced in the return assist setpoint (in application of the function FK2) by the presence, in the steering wheel speed error ΔV (at the input of said function FK2), of an excess speed viscous component V_visc.

The above expression can therefore be expressed formally by:

$$T\_rec=T\_pure+T\_visc$$

where T_visc represents said undesirable viscous component, induced by the presence of a speed component V_visc in excess in the steering wheel speed error ΔV.

In other words, due to the existence of a speed viscous component V_visc which increases the steering wheel speed error ΔV at the instant considered, a «raw» application (without the saturation object of the invention) of the return assist calculation function FK2 would lead to defining a return assist setpoint T_rec which would be too high, and which would contain, in addition to the useful and normal pure return component T_pure, representative of the return action intuitively expected by the driver, an undesirable viscous component T_visc which tends to be opposed to the maneuver of the steering wheel by the driver, and which thus gives an artificial feeling of heaviness.

For convenience of description, the same graph will be used herein, in FIG. 4, to describe the steering situation, on the one hand, relative to the steering wheel speeds V_sw and the steering wheel speed setpoints V_sw_set, and, on the other hand, relative to the return assist setpoints (return torque setpoint) T_rec.

In said graph of FIG. 4, reference is thus made more particularly, with regard to the steering wheel speeds V_sw, to:

V_sw the actual speed of the steering wheel;

V_sw_set the steering wheel speed setpoint defined by the speed setpoint calculation function FK1;

D1 the steering domain, corresponding herein to the north-east quadrant for a steering to the right, and to the south-west quadrant for a turning to the left;

D2 a second domain called «pure return domain» comprised between the abscissa axis (V_sw=0) and the curve L1 representative of the steering wheel speed setpoint V_sw_set defined by the function FK1;

$\Delta V=V\_sw\_set-V\_sw$ the steering wheel speed error with ΔV=V_pure+V_visc, where V_pure=V_sw_set corresponds to the portion (component) of ΔV contained in the pure return domain D2, and V_visc corresponds to the excess portion (component) ΔV, contained in the steering domain D1.

Similarly, with regard to the assist setpoints, reference is made to:

T_rec=FK2(ΔV), the return assist setpoint produced (herein in a row manner, without saturation) by the return assist calculation function FK2;

which is such that T_rec=T_pure+T_vis, where T_pure=FK2(V_sw_set) corresponds to the portion (component) of T_rec which is representative of a pure return action, and which is contained graphically in a pure return domain D2_T, while T_visc corresponds to the excess portion (component) of T_rec, contained in a steering domain (viscous domain) D1_T, and which is representative of an undesirable additional action of braking the steering wheel against the maneuver of the steering wheel by the driver;

D1_T is a first viscous steering domain, which corresponds herein to the north-east (steering to the right) and south_west (turning to the left) quadrants, and in which there is a surplus of return torque which is opposed to the steering;

D2_T is a second pure return domain, which extends between the abscissa axis and the image curve of the curve L1 by the return assist calculation function FK2, that is to say which is herein preferably comprised between zero and FK2(V_sw_set).

Graphically, in a steering situation as detailed above with reference to FIG. 4, the steering wheel speed error ΔV exceeds, in absolute value, the value of the return speed setpoint V_sw_set, so that the return assist setpoint T_rec which results therefrom, extends beyond the pure return domain D2_T.

However, if the pure return component Tpure, respectively V_pure in speed, corresponds to an intuitive feeling of the steering wheel 2 during the steering, the viscous component T_visc, respectively V_visc in speed, creates an artificial heaviness in the steering wheel 2, which is all the stronger when, at the same given position P_sw (and therefore at the same position error ΔP) of the steering wheel, the steering speed V_sw provided to the steering wheel by the driver is high (in absolute value).

The purpose of the saturation proposed by the invention is therefore to eliminate this undesirable viscous component T_visc, V_visc, so as to limit, in a steering situation, the return of the steering wheel 2 to the only pure return component T_pure, V_pure, which corresponds to a given steering wheel position P_sw.

FIG. 5 illustrates a slow counter-steering situation, that is to say a situation in which the driver maneuvers the steering wheel 2 so as to bring said steering wheel 2 closer to the reference position P0 thereof (herein from right to left), to reduce the steering angle of the power steering system 1 relative to said reference position P0, and in which the steering wheel speed V_sw imparted by the driver is less, in absolute value, than the steering wheel speed setpoint V_sw_set, and of the same sign as said steering wheel speed setpoint V_sw_set.

In practice, this slow counter-steering situation can in particular concern a situation in which the driver releases the steering wheel 2 and lets it return freely to the reference position P0, after having turned said steering wheel 2 to take a turning.

This slow counter-steering situation of FIG. 5 corresponds to a second operating point OP2, located in the pure return domain D2, here of the south-east quadrant.

This time, the steering wheel speed error $\Delta V$, and therefore the return assist setpoint T_rec=FK2($\Delta V$) which results therefrom, is entirely contained in the pure return domain D2, respectively D2_T, and therefore only includes a pure return component.

This pure return component has the effect of accelerating the return of the steering wheel, and therefore of giving this return a natural consistency in view of the position of the steering wheel 2, and therefore in view of the spacing-apart distance $\Delta P$ which separates the steering wheel 2 from the reference position P0, at the instant considered.

In such a situation, which corresponds to the normal operation of the return function REC, the return assist setpoint T_rec does not comprise any undesirable components.

It is therefore not necessary to change the return assist setpoint T_rec, nor the steering wheel speed error $\Delta V$ which constitutes the antecedent of said return assist setpoint T_rec by the return assist calculation function FK2, to obtain a return feeling which is intuitive and in accordance with the situation. In practice, the saturation specific to the invention therefore does not actively change the calculation performed by the return assist calculation function FK2 in such a situation.

FIG. 6 illustrates a quick counter-steering situation, in which the driver maneuvers the steering wheel 2 so as to bring said steering wheel 2 closer to its reference position P0 (here from right to left), to reduce the steering angle of the power steering system 1 relative to said reference position P0, but this time at a steering wheel speed V_sw which is higher, in absolute value, than the steering wheel speed setpoint V_sw_set, and with the same sign as said steering wheel speed setpoint V_sw_set.

This quick counter-steering situation corresponds to a third operating point denoted OP3, which is located in a third domain, herein the south-east quadrant, called «damping domain» D3, which extends beyond the speed setpoint curve L1 of relative to the abscissa axis, opposite to the pure return domain D2 relative to said curve L1.

In this situation, the steering wheel speed error $\Delta V$ is entirely located in the damping domain D3, and corresponds to a damping component V_damp.

Consequently, the return assist setpoint T_rec=FK2($\Delta V$) which results therefrom, is entirely located in a damping domain D3_T, which extends in the south-east quadrant beyond the image of the curve L1 by the return assist calculation function FK2, and thus corresponds to a damping component T_damp, oriented here positively, which tends to reduce, in absolute value, the speed of the steering wheel V_sw so that it joins the steering wheel speed setpoint V_sw_set.

Thus, the damping component T_damp creates a resistive torque which brakes the steering wheel 2, against the return movement desired by the driver.

The object of the invention is therefore, herein again, removing this undesirable damping component T_damp, or, in an equivalent manner, deleting the speed component V_damp whose presence is at the origin of the existence of this damping component T_damp in the return assist torque setpoint T_rec, so as to let the driver naturally operate the steering wheel return at the high speed P_sw that he desires.

In practice, in this quick counter-steering situation illustrated in FIG. 6, it is considered that, since the driver returns the steering wheel 2 to its reference position P0 faster than what the return function REC would automatically do, this means that there is no need to provide a return assist.

Concretely, the saturation specific to the invention herein allows, in a way, inhibiting the return function REC, and generating a return assist setpoint T-rec which is zero, rather than generating and applying to the assist motor 3, by a raw application of said return function REC, a return assist setpoint T_rec=T_damp which would correspond to a damping component T_damp which would hinder the manual action of the driver.

Of course, it Is found, with the difference of sign, symmetrically relative to the origin (P0, 0) of the coordinate system, the same domains D1, D2, D3 and the same principles when situations of steering and counter-steering a steering wheel 2 turned on the left side relative to its reference position P0 are considered, that is to say if the north-west and south-west quadrants of the diagrams, corresponding to the negative abscissas are considered.

In order to achieve the elimination of possible undesirable components T_visc, V_visc, T_damp, V_damp while retaining the return effect, the power steering system 1 according to the invention comprises, as illustrated in FIG. 1, a dynamic saturation function, denoted RDS for «Returnability Dynamic Saturation», which defines at least one saturation threshold SAT_high, SAT_low, which said dynamic saturation function RDS adjusts depending on the value of the steering wheel speed setpoint V_sw_set (at the instant considered), then that said dynamic saturation function RDS applies to clip the calculation carried out by the return assist calculation function FK2, so as to contain the return assist setpoint T_rec in a domain called «authorized return assist domain».

For convenience of representation, one notes:

THRESH_RDS the sub-function of the dynamic saturation function RDS, called «threshold calculation sub-function», which calculates the saturation threshold(s) SAT_high, SAT_low depending on the steering wheel speed setpoint V_sw_set, and SAT_RDS the sub-function of the dynamic saturation function RDS, called «clipping sub-function», which carries out the saturation operation by applying to the signal it processes the saturation threshold(s) SAT_high, SAT_low defined by THRESH_RDS, in order to clip said signal.

In this case, the authorized return assist domain corresponds to the pure return domain D2_T associated to the return assist setpoint T_rec (return torque setpoint) as mentioned above with reference to FIGS. 4 to 6.

By extension, the antecedent of said authorized return assist domain D2_T by the return assist calculation function FK2 will be an authorized steering wheel speed setpoint domain corresponding to the pure return domain D2 associated to the steering wheel speed error ΔV.

Advantageously, the evolving saturation proposed by the invention allows calculating and adapting as closely as possible, in real time, the saturation thresholds SAT_high, SAT_low, and therefore the return assist setpoint T_rec, depending on the exact maneuvering situation of the steering wheel 2 at the instant considered, so as to apply, to the assist motor 3, a return assist setpoint T_rec from which any possible undesirable components T_damp, T_visc have been eliminated, and only said undesirable components.

In practice, if the conditions for applying the return assist calculation function FK2 are such that, in the absence of a dynamic saturation function RDS, said application of the function FK2 would generate a return assist setpoint T_rec which would be beyond the authorized return assist domain D2_T, then the dynamic saturation function RDS intervenes to apply, in the course of the return assist calculation function FK2, a considered saturation threshold SAT_high, SAT_low, which replaces a value considered inappropriate (herein for example either an excessive steering wheel speed error ΔV, or an excessive return assist setpoint T_rec), so as to ultimately limit the return assist setpoint T_rec, and thus bring back, into the authorized return assist domain D2_T, said return assist setpoint T_rec which will be effectively applied to the assist motor 3.

However, if the conditions for applying the return assist calculation function FK2 are such that, even in the absence of a dynamic saturation function RDS, the return assist setpoint T_rec is located in the authorized return assist domain to the D2_T, and therefore that the values used or obtained by said return assist calculation function FK2 are compatible with the considered saturation threshold(s) SAT_high or SAT_low, then no modification is made by the dynamic saturation function RDS during the course of the return assist calculation function FK2, so that the raw return assist setpoint T_rec is applied as it is to the assist motor 3.

Taking into account the steering wheel speed setpoint V_sw_set, which represents the need for return, to define at least one saturation threshold SAT_high, SAT_low, advantageously allows said saturation threshold to define the limit (the border) of a pure return domain D2, D2_T, outside which the generated return components correspond to undesirable components T_visc, T_damp.

Preferably, the dynamic saturation function RDS, and more particularly the threshold calculation sub-function THRESH_RDS, defines a high saturation threshold SAT_high and a low saturation threshold SAT_low, that said dynamic saturation function RDS, and more particularly the sub-function THRESH_RDS, adjusts, on the one hand, depending on the speed of the vehicle and, on the other hand, depending to the value of the steering wheel setpoint V_sw_set.

Preferably, the sub-function THRESH_RDS adjusts the calculation of thresholds THRESH_RDS depending on the sign of the position of the steering wheel P_sw relative to the reference position P0 at the time considered.

The fact of jointly defining and applying two limits, namely (algebraically) a lower limit formed by the low saturation threshold SAT_low and an upper limit formed by the high saturation threshold SAT_high advantageously allows defining an authorized domain comprised between these two limits, corresponding herein to the pure return domain D2, D2_T which extends from the low saturation threshold SAT_low to the high saturation threshold SAT_high, and excluding the adjacent domains, in this case the (viscous) steering D1, D1_T and damping D3, D3_T domains, and proceeding to a top and bottom clipping.

Both steering situations (FIG. 4) and quick counter-steering situations (FIG. 6) can thus be managed.

Taking into account the sign of the position of the steering wheel P_sw allows distinguishing the situations of a steering wheel turned to the right from situations of a steering wheel turned to the left, and changing the saturation thresholds SAT_high, SAT_low accordingly.

It should also be noted that the high saturation threshold SAT_high and the low saturation threshold SAT_low are preferably not equal in amplitude (that is to say in absolute value), so as not to be symmetrical to each other relative to zero.

More particularly, preferably, and according to a feature which may constitute an invention in its own right, one of the saturation thresholds, among the high saturation threshold SAT_high and respectively the low saturation threshold SAT_low, is set to zero, while the other saturation threshold corresponds to a non-zero value whose sign depends on the sign of the steering wheel speed setpoint V_sw_set.

More preferably, the amplitude, in absolute value, of said other non-zero saturation threshold, depends on the value of the steering wheel speed setpoint V_sw_set.

More particularly, the non-zero saturation threshold preferably corresponds to the speed setpoint curve L1 mentioned above, or to the image of said curve L1 by the second conversion law K2 used by the return assist calculation function FK2.

The zero saturation threshold allows in practice preventing the appearance of a return assist setpoint T_rec which would be of the same sign as the position of the steering wheel P_sw, that is to say which would tend to move the steering wheel away from the reference position thereof, by opposing to the return desired by the driver.

Said zero saturation threshold thus allows removing (canceling) the damping component V_damp, T_damp which would otherwise tend to brake the manual return of the steering wheel in a quick counter-steering situation.

In practice, the choice of the zero threshold depends on the sign of the position of the steering wheel P_sw (relative to the reference position P0).

Here, in view of the used sign convention, the zero saturation threshold corresponds algebraically to the high threshold SAT_high for the positive steering wheel positions P_sw, herein in the situation of a steering wheel turned to the right (East half-plane of the four quadrant diagram), but, conversely, to the low threshold for the negative steering wheel positions (West half-plane), in the situation of a steering wheel turned to the left.

The other non-zero threshold, whose sign and value depend on the steering wheel speed setpoint V_sw_set advantageously allows containing the amplitude (in absolute value) of the return assist setpoint T_rec, finally applied to the assist motor 3, below a maximum value which corresponds to the maximum authorized pure return component T_pure taking into account the position of the steering wheel P_sw at the time considered.

Thus, the non-zero saturation threshold allows removing (cutting) the undesirable viscous component T_visc, V_visc, which comes in excess of the pure return component T_pure, V_pure in a steering situation.

Thus, the two selected saturation thresholds SAT_high, SAT_low allow effectively dealing with all identified problematic situations (steering, FIG. 4, and quick manual counter-steering, FIG. 6), without interfering with the normal situation of slow counter-steering (FIG. 4).

According to a preferred feature which can constitute an invention in its own right, regardless in particular of how the return function REC sets a return assist setpoint T_rec, the saturation threshold(s) SAT_high, SAT_low defined by the dynamic saturation function RDS, and more particularly by the threshold calculation sub-function THRESH_RDS, are independent of the actual speed V_sw of the steering wheel 2.

Thus, the authorized domain D2, D2_T defined and applied by the dynamic saturation function RDS is correlated with the steering wheel speed setpoint V_sw_set, and therefore varies in dependence on the steering wheel speed setpoint V_sw_set, but remains independent of the actual speed of the steering wheel V_sw, and therefore invariant depending on the actual speed of the steering wheel V_sw, which is not involved in determining the saturation thresholds SAT_high, SAT_low.

Thus, unlike the return assist setpoint T_rec, which is defined by the «raw» calculation which is performed by the return assist calculation function FK2 from the steering wheel speed error ΔV, and therefore by including (and undergoing) the influence of the actual speed of the steering wheel V_sw, the saturation thresholds SAT_high, SAT_low, and therefore the authorized domain D2, D2_T are not affected by said actual speed of the steering wheel V_sw.

Advantageously, it is thus possible to de-correlate the saturation thresholds on the one hand, which are defined from the (only) steering wheel speed setpoint V_sw_set, that is to say from the maximum return requirement which can be useful at the considered position P_sw of the steering wheel 2, of the steering wheel speed error ΔV and of the return assist setpoint T_rec on the other hand, which both depend on the steering wheel speed error ΔV, and which therefore both depend on the actual speed behavior of the steering wheel V_sw.

In this manner, the adjustment of the saturation thresholds SAT_high, SAT_low is made sensitive to the instantaneous need for return, a need which is expressed from the position of the steering wheel P_sw, and herein more particularly in the form of the steering wheel speed setpoint V_sw_set which is associated to said position of the steering wheel P_sw by the return speed setpoint calculation function FK1, but insensitive to the behavior of the driving wheel 2, which does not depend solely on the need for return, but also on the driver's will and gestures, which is expressed herein by the actual instantaneous speed V_sw of the steering wheel.

The invention therefore allows distinguishing between pure return behavior and the undesirable components induced by certain manual actions of the driver outside the limits of this pure return, and consequently effectively, and only preferably, removing these undesirable components.

According to a possibility of implementation, and as illustrated in FIG. 7, the dynamic saturation function RDS acts on the input of the return assist calculation function FK2, so as to clip the steering wheel speed error ΔV which is taken into account for calculating the return assist setpoint T_rec.

Formally, if one denotes SAT_RDS the sub-function which applies the dynamic saturation defined by the dynamic saturation function RDS (that is to say which applies the saturation thresholds to the considered value), one will therefore have, in this configuration:

$$T\_rec = FK2(SAT\_RDS(\Delta V))$$

Thus, a «preventive» clipping is carried out, which allows the steering wheel speed error ΔV to be saturated, upstream of the function FK2, so as to apply, as input to the return assist calculation function FK2, a steering wheel speed error value ΔV of which it is ensured that the image by said function FK2 will be contained entirely in the authorized return assist domain D2_T, that is to say:

$$FK2(SAT\_RDS(\Delta V)) \subset D2\_T$$

Therefore $T\_rec \subset D2\_T$

To do this, one will make sure that the clipping has the effect of containing the steering wheel speed error ΔV in the pure return domain D2 which constitutes the antecedent of the authorized return assist domain D2_T by the return assist calculation function FK2 (as detailed above with reference to FIGS. 4 to 6):

$$SAT\_RDS(\Delta V) \subset D2$$

The saturation thresholds SAT_high, SAT_low, which are homogeneous at steering wheel speeds, will therefore be defined, so that said saturation thresholds correspond to the limits (boundaries) of said pure return domain D2.

For this purpose, preferably, the dynamic saturation function RDS might clip the steering wheel speed error ΔV so that said steering wheel speed error ΔV is comprised between a first saturation threshold substantially equal, and preferably equal, to zero, and a second saturation threshold substantially equal, and preferably equal, to the steering wheel speed setpoint value V_sw_set.

By «substantially equal», it is indicated here that there may be a predefined tolerance range relative to the targeted target values (here zero and V_sw_set respectively), said tolerance range herein preferably being equal to or less than +/−10%, and preferably equal to or less than +/−5% of the steering wheel speed setpoint value V_sw_set.

Thus, in the East half-plane of the diagrams of FIGS. 4 to 6, which corresponds to a situation where the steering wheel 2 is turned to the right of the reference position P0, one can set:

SAT_high=0 (possibly +/−10%*V_sw_set, even +/−5% V_sw_set)

SAT_low=V_sw_set (possibly +/−10%*V_sw_set, even +/−5%*V_sw_set)

Conversely, in the West half-plane corresponding to a steering to the left of the reference position P0, due to the change of sign, one will have:

SAT_high=V_sw_set (possibly +/−10%*V_sw_set, even +/−5%*V_sw_set)

SAT_low=0 (possibly +/−10%*V_sw_set, even +/−5%*V_sw_set)

Such saturation thresholds SAT_high, SAT_low, homogeneous at steering wheel speeds, can be calculated by means of any appropriate sub-function THRESH_RDS.

An example of a threshold calculation sub-function THRESH_RDS is illustrated in FIG. 7.

In this example, the threshold calculation sub-function THRESH_RDS uses a comparison with zero of the steering wheel speed setpoint value V_sw_set which is issued by the return speed setpoint calculation function FK1, as follows:

SAT_high=MAX[V_sw_set;0]

SAT_low=MIN[V_sw_set;0]

Of course, a tolerance interval of +/−10%*V_sw_set or even +/−5%*V_sw_set can possibly be applied to these thresholds, as indicated above.

It should be noted that such a sub-function THRESH_RDS is particularly simple and quick to implement.

According to another possibility of implementation, substantially equivalent to the previous one regarding the final result which it allows obtaining, and as shown in FIG. 1, the dynamic saturation function RDS acts on the output of the return assist calculation function FK2 so as to clip the return assist setpoint T_rec calculated by said return assist calculation function FK2.

So one will have this time:

$$T\_rec=SAT\_RDS(FK2(\Delta V))$$

Thus, a «curative» clipping is carried out, which allows saturating the return assist setpoint T_rec, downstream of the function FK2, so as to correct, if necessary, the output of the return assist calculation function FK2 such that the return assist setpoint T_rec which results therefrom is indeed exclusively contained in the authorized return assist domain D2_T.

More particularly, with reference to FIG. 1, the return assist calculation function FK2 could calculate a return assist raw setpoint T_rec_basic, from a steering wheel speed error ΔV of any value (which might or might not have been saturated by a function RDS according to the invention), while the dynamic saturation function RDS, and more particularly the clipping sub-function SAT_RDS, will then apply the saturation thresholds SAT_high, SAT_low to said return assist raw setpoint T_rec_basic to obtain an appropriate return assist final setpoint T_rec.

The saturation thresholds SAT_high, SAT_low, homogeneous at return torques (or forces), are defined herein, so that said saturation thresholds correspond to the limits (borders) of the authorized return assist domain D2_T.

Figure 2:
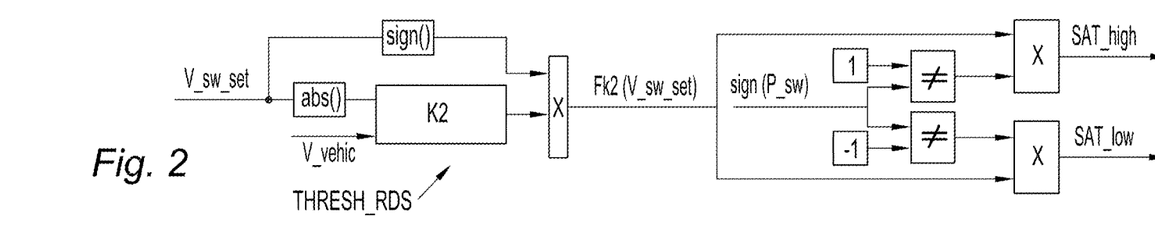
FIG. 2 illustrates, according to a block diagram, a dynamic calculation of the high and low saturation thresholds according to the invention, applicable to the first example of FIG. 1.
Figure 3:
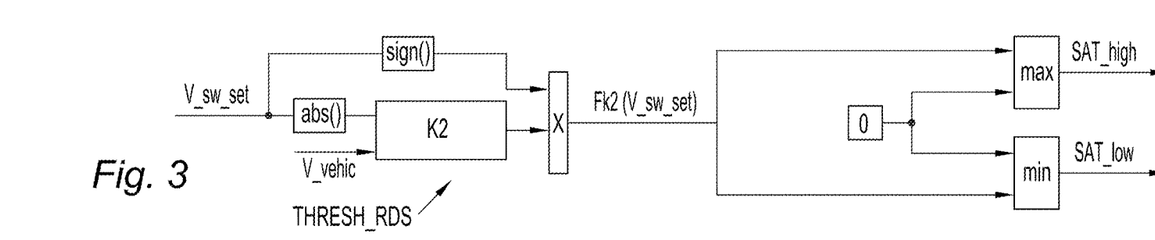
FIG. 3 illustrates another variant of dynamic calculation of the high and low saturation thresholds according to the invention, applicable to the first example of FIG. 1.

For this purpose, preferably, and as illustrated in FIGS. 1, 2 and 3, the dynamic saturation function RDS clips the return assist setpoint T_rec so that said return assist setpoint T_rec is comprised between a first saturation threshold which is substantially equal, and preferably equal, to zero, and a second saturation threshold which is substantially equal, and preferably equal, to the image, by the return assist calculation function FK2, of a steering wheel speed error ΔV equal to the steering wheel setpoint value V_sw_set.

By «substantially equal», it is indicated herein that there may be a predefined tolerance range relative to the targeted target values (herein zero=FK2(0) and FK2(V_sw_set) respectively), said tolerance range herein preferably being equal to or less than +/−10%, and preferably equal to or less than +/−5% of the image value of the steering wheel speed setpoint value FK2(V_sw_set).

Thus, in the East half-plane of the diagrams of FIGS. 4 to 6, which corresponds to a situation where the steering wheel 2 is turned to the right of the reference position P0, one can set:

$$SAT\_high=FK2(0)=0 \text{ (possibly } +/-10\%*FK2(V\_sw\_set), \text{ even } +/-5\%*FK2(V\_sw\_set))$$

$$SAT\_low=FK2(V\_sw\_set) \text{ (possibly } +/-10\%*FK2(V\_sw\_set), \text{ even } +/-5\% FK2(V\_sw\_set))$$

Conversely, in the West half-plane corresponding to a steering to the left of the reference position P0, due to the change of sign, one will have:

$$SAT\_high=FK2(V\_sw\_set) \text{ (possibly } +/-10\%*FK2(V\_sw\_set), \text{ even } +/-5\%*FK2(V\_sw\_set))$$

$$SAT\_low=FK2(0)=0 \text{ (possibly } +/-10\%*FK2(V\_sw\_set), \text{ even } +/-5\%*FK2(V\_sw\_set))$$

It should be noted that, for simplicity and for the sake of consistency, the same second conversion law K2 is advantageously used, and more generally the same return assist calculation function FK2, to calculate the return assist setpoint T_rec from the steering wheel speed error ΔV and to calculate the saturation thresholds SAT_high, SAT_low which are applicable for clipping the return assist setpoint at the output of the function FK2.

Thus, that the dynamic saturation function RDS clips the steering wheel speed error ΔV at the input of the return assist calculation function FK2 and/or that it clips the return assist setpoint T_rec, if necessary the raw return assist setpoint T_rec_basic, at the output of said return assist function FK2, said dynamic saturation function RDS will have the effect of keeping only the useful component V_pure, respectively T_pure corresponding exclusively to the need for pure return, and eliminating any undesirable components (V_visc, V_damp at the steering wheel speed, and/or respectively T_visc, T_damp at return assist setpoint, homogeneous here at torque) which would induce a viscosity or a damping in the return.

Thus, as explained above, the saturation threshold will be defined depending on the need for return, and might extract and if necessary remove from the return assist setpoint T_rec a possible undesirable viscous component T_visc which would be induced by the real behavior at a speed V_sw of the steering wheel.

In the case where the saturation thresholds SAT_high, SAT_low are applied to the return assist setpoint T_rec, T_rec_basic at the output of the return assist calculation function FK2, the threshold calculation sub-function THRESH_RDS can for example use, according to a first variant illustrated in FIG. 3, a comparison to zero of the value of the image by the return assist calculation function FK2 of the steering wheel speed setpoint V_sw_set which is emitted by the return speed setpoint calculation function FK1, as follows (if necessary with a tolerance as specified above):

$$SAT\_high=MAX[FK2(V\_sw\_set);0]$$

$$SAT\_low=MIN[FK2(V\_sw\_set);0]$$

According to a second variant, equivalent in its purpose, and illustrated in FIG. 2, the saturation thresholds could be obtained by the following formulas:

High Saturation Threshold:

$$SAT\_high=[sign(P\_sw)\neq 1]*FK2(V\_sw\_set),$$

Low Saturation Threshold:

$$SAT\_low=[sign(P\_sw)\neq 1]*FK2(V\_sw\_set)$$

where

P_sw designates the position of the steering wheel,

V_sw_set designates the speed setpoint of the steering wheel,

FK2 represents the return assist calculation function, the function «sign» returns the value «1» if the sign of the tested expression is positive, and the value «−1» if the sign of the tested expression is negative, the inequality symbol «≠» is a Boolean function which returns the value «1» if the two members of the tested equation are different, and the value «0» if the two members of the tested equation are equal.

It should be noted that, according to this second variant of FIG. 3, if the sign of the position of the steering wheel P_sw relative to the reference position P0 is positive, then the Boolean function 1≠1 returns zero, since equal values, so that $$SAT\_high=[sign(P\_sw)\neq 1]*FK2(V\_sw\_set)=0*FK2(V\_sw\_set)=0.$$

Regardless of the used threshold calculation function variant THRESH_RDS, there is a zero saturation threshold, and the other non-zero saturation threshold directly correlated to the steering wheel speed setpoint, as described above, which allows the saturation of the steering wheel speed setpoint V_sw_set to be dependent, while making said saturation independent of the actual steering wheel speed V_sw.

The operation of the return function and the associated dynamic saturation will now be described with reference to the illustrative examples of FIGS. 3, 4 and 5.

For the sake of convenience, and in order to facilitate the understanding of the invention, we will now illustrate the operation of the saturation in the three previously studied situations, by giving fictitious values to the magnitudes of position and of steering wheel speed, expressed in arbitrary units.

Furthermore, the illustration will be made with reference to the arrangement of FIG. 1, considering that the dynamic saturation function RDS acts at the output of the return assist calculation function FK2 to clip the return assist raw setpoint T_rec_basic.

Of course, a similar operation could be described mutatis mutandis with reference to a clipping carried out on the steering wheel speed error at the input of the return assist calculation function FK2, according to the arrangement illustrated in FIG. 7.

In a steering situation corresponding to FIG. 4, one set, at OP1:

$$\Delta P=P\_sw>0$$

$$V\_sw=3$$

$$V\_sw\_set=FK1(\Delta P)=-5$$

One then have:

$$\Delta V=V\_sw\_set-V\_sw=(-5)-(3)=-8$$

$$T\_rec\_basic=FK2(-8)$$

Moreover, as long as the steering wheel is turned to the right, there is $$Sign(P\_sw)=+1 \text{ because } P\_sw>0$$

Therefore $$SAT\_high=[sign(P\_sw)\neq 1]*FK2(V\_sw\_set)=0*FK2(V\_sw\_set)=0$$

And $$SAT\_low=[sign(P\_sw)\neq -1]*FK2(V\_sw\_set)=1*FK2(V\_sw\_set)=FK2(-5)$$

In this case, there is, algebraically:

$$FK2(-8)<FK2(-5), \text{ that is to say } T\_rec\_basic<SAT\_low,$$

and more generally
$$T\_rec\_basic<SAT\_low<SAT\_high$$

By applying the aforementioned saturation thresholds SAT_high=0, SAT_low=FK2(V_sw_set)=FK2(-5) to the return assist raw setpoint T_rec_basic=FK2(-8), the clipping sub-function SAT_RDS therefore returns FK2(-5), which corresponds to the low saturation threshold.

Finally, one thus obtains:

$$T\_rec=SAT\_RDS(T\_rec\_basic)=SAT\_low=FK2(V\_sw\_set)=FK2(-5), \text{ instead of } FK2(-8).$$

The return assist setpoint T_rec thus corresponds to the pure return component T_pure, which, thanks to the clipping, corresponds to the result obtained by subtracting from the return assist raw setpoint T_basic_rec the viscous component T_visc=T_basic_rec−T_pure=T_basic_rec−FK2(V_sw_set)=FK2(ΔV)−FK2(V_sw_set).

Thus, in the steering situation, there is certainly a return torque T_rec opposite to the movement away from the steering wheel, but whose intensity is limited and constant, at a given steering wheel position P_sw (and where appropriate for a given longitudinal vehicle speed V_vehic), regardless of the speed V_sw at which the driver actuates the steering wheel 2, that is to say the intensity of which depends only on the distance of the steering wheel from the reference position P0 thereof and not on the steering wheel actuation speed V_sw.

In a slow steering situation corresponding to FIG. 5, for the same position of the steering wheel P_sw as previously (and if necessary at the same longitudinal speed V_vehic as previously), and therefore for the same steering wheel speed setpoint V_sw_set, one observes, at the operating point OP2:

$$V\_sw=-2$$

$$V\_sw\_set=FK1(\Delta P)=-5 \text{ (unchanged)}$$

Then there is:

$$\Delta V=V\_sw\_set-V\_sw=(-5)-(-2)=-3$$

And therefore $T\_rec\_basic=FK2(-3)$

The steering wheel being always turned to the right, the saturation thresholds are unchanged: SAT_high=0, SAT_low=FK2(−5).

Since $FK2(-5)<FK2(-3)<0,$ that is to say $SAT\_low<T\_rec\_basic<SAT\_high$ then the clipping sub-function SAT_RDS returns FK2(−3), that is to say keeps, without changing it, the basic setpoint T_rec_basic, which corresponds to the expected (pure) return component.

Therefore, there is obtained $T\_rec=T\_rec\_basic=FK2(\Delta V)=FK2(-3)$

In a quick counter steering situation corresponding to FIG. 6, always for the same position of the steering wheel P_sw as previously, it is observed, at the operation point OP3:

$$V\_sw=-7$$

$$V\_sw\_set=FK1(\Delta P)=-5 \text{ (unchanged)}$$

One thus have:

$$\Delta V=V\_sw\_set-V\_sw=(-5)-(-7)=+2$$

And therefore $T\_rec\_basic=FK2(+2)$

Here again, the saturation thresholds are the same as in the previous examples: SAT_high=FK2(0)=0, SAT_low=FK2(−5)

As $FK2(+2)>FK2(0)=0$ that is to say $T\_rec\_basic>SAT\_high>SAT\_low$ then the clipping sub-function SAT_RDS returns a value equal to the high saturation threshold SAT_high=0, which amounts to removing the damping component T_damp which tends to brake the manual return:

$$T\_rec=SAT\_RDS(T\_rec\_basic)=SAT\_high=FK2(0)=0$$
instead of $FK2(+2)$.

It should be noted that, by choosing $FK2(\Delta V=0)=0$, and therefore herein SAT_high=0 and T_rec=0, this simply amounts to considering that it is not useful for the assist motor 3 to deliver a specific component to the return if the driver already manually actuates on his own, the steering wheel 2, at a speed which is high enough to reach (and a fortiori exceed) the «ideal» steering wheel speed setpoint V_sw_set, as defined by the function FK1, that is to say when there is V_sw=V_sw_set and consequently when there is $\Delta V=V\_sw\_set-V\_sw=0$.

Such a choice therefore allows not creating a return assist when the driver does not need it, and a fortiori not hindering the movement of the steering wheel when the driver performs a return to the reference position P0 faster than that nominally defined by the return speed setpoint calculation function FK1.

Of course, the invention concerns as such a motor vehicle equipped with a power steering system 1 according to the invention.

Of course, the invention concerns a return assist setpoint saturation method, and more generally a steering wheel return method conducted according to any one of the features of the invention.

In particular, the invention therefore concerns a steering wheel return method allowing automatically returning the steering wheel of a power steering system 1 to a given reference position P0, for example a central position, when the steering wheel is in a position P_sw distinct from said reference position P0, a process during which a steering wheel speed setpoint V_sw_set is first of all calculated from the deviation, called «steering wheel position error» $\Delta P$, between the instantaneous actual position of the steering wheel and the reference position, then from the deviation, called «steering wheel speed error» $\Delta V$, between the actual speed V_sw of the steering wheel and said steering wheel speed setpoint V_sw_set, a setpoint called «return assist setpoint» T_rec which is intended to control an assist motor 3 to converge the actual speed of the steering wheel P_sw to the steering wheel speed setpoint P_sw_set, said method being characterized in that it comprises a dynamic saturation step, during which at least one saturation threshold SAT_high, SAT_low is defined, which is adjusted depending on the value of the steering wheel setpoint V_sw_set, then applied to clip the calculation of the return assist setpoint so as to contain said return assist setpoint T_rec in a domain called «authorized return assist domain» D2_T, whose extent is correlated with the value of the steering wheel speed setpoint V_sw_set.

The invention finally concerns a data medium readable by a computer, of the hard disk, flash memory, USB key, optical disk, electronic card or equivalent type, and containing code elements of a computer program allowing implementing a method according to the invention, or any function and/or sub-function of said method, when said support is read by a computer.

Of course, the invention is in no way limited to the only aforementioned variants, those skilled in the art being in particular capable of freely isolating or combining together either one of the aforementioned features, or substituting them with equivalents.

In particular, the invention concerns as such the use, within a power steering system 1 comprising a steering wheel return function REC, of a dynamic saturation function RDS whose saturation threshold(s) SAT_high, SAT_low are defined from the steering wheel speed setpoint V_sw_set defined by the return function REC, but independent of the actual speed V_sw of the steering wheel 2, so as to contain the return assist setpoint T_rec which is applied by the return function REC to the assist motor 3 in an authorized return assist domain D2_T whose limits are set by the saturation threshold(s) SAT_high, SAT_low.

The invention claimed is:

1. A power steering system comprising:
    a steering wheel;
    an assist motor; and
    a computer programmed to execute:
        (i) a return function to automatically return said steering wheel to a given reference position when the steering wheel is in a position distinct from said reference position,
        said return function comprising
            a return speed setpoint calculation function which calculates a steering wheel speed setpoint, from a steering wheel position error between the instantaneous actual position of the steering wheel and the reference position, and
            a return assist calculation function which calculates, from a steering wheel speed error between the actual speed of the steering wheel and said steering wheel speed setpoint, a return assist setpoint which is used to control the assist motor to converge the actual speed of the steering wheel to the steering wheel speed setpoint, and
        (ii) a dynamic saturation function which defines at least one saturation threshold which is adjusted depending on the value of the steering wheel speed setpoint, said dynamic saturation function applying the adjusted at least one saturation threshold to correct the return assist setpoint calculated by the return assist calculation function such that an excess setpoint induced by an excess speed viscous component in the steering wheel speed error is eliminated from the return assist setpoint, wherein
    the corrected return assist setpoint is applied to the assist motor to converge the actual speed of the steering wheel to the steering wheel speed setpoint.

2. The power steering system according to claim 1, wherein the at least one saturation threshold includes a high saturation threshold and a low saturation threshold, that said dynamic saturation function adjusts depending on the vehicle speed and depending on the value of the steering wheel setpoint.

3. The power steering system according to claim 2, wherein one of the high saturation threshold and the low saturation threshold is set to zero, and the other of the high saturation threshold and the low saturation threshold corresponds to a non-zero value whose sign depends on the sign of the steering wheel speed setpoint.

4. The power steering system according to claim 1, wherein the dynamic saturation function corrects the steering wheel speed error which is taken into consideration to calculate the return assist setpoint.

5. The power steering system according to claim 4, wherein the dynamic saturation function corrects the steering wheel speed error so that said steering wheel speed error is comprised between a first saturation threshold substantially equal to zero, and a second saturation threshold substantially equal to the steering wheel speed setpoint value.

6. The power steering system according to claim 1, wherein the dynamic saturation function corrects the return assist setpoint so that said return assist setpoint is between a first saturation threshold substantially equal to zero, and a second saturation threshold substantially equal to the image by the return assist calculation function of a steering wheel speed error equal to the steering wheel setpoint value.

7. The power steering system according to claim 1, wherein the at least one saturation threshold defined by the dynamic saturation function is independent of the actual speed of the steering wheel.

8. A motor vehicle equipped with a power steering system according to claim 1.

9. A steering wheel return method for automatically returning a steering wheel of a power steering system to a given reference position when the steering wheel is in a position distinct from said reference position, the method comprising:

calculating a steering wheel speed setpoint, from a steering wheel position error between the instantaneous actual position of the steering wheel and the reference position;

calculating a return assist setpoint, from a steering wheel speed error between the actual speed of the steering wheel and said steering wheel speed setpoint, the return assist setpoint being used to control an assist motor of the power steering system to converge the actual speed of the steering wheel to the steering wheel speed setpoint; and defining at least one saturation threshold which is adjusted depending on the value of the steering wheel speed setpoint, and applying the adjusted at least one saturation threshold to correct the calculated return assist setpoint such that an excess setpoint induced by an excess speed viscous component in the steering wheel speed error is eliminated from said return assist setpoint, wherein the corrected return assist setpoint is applied to the assist motor to converge the actual speed of the steering wheel to the steering wheel speed setpoint.

10. A non-transitory computer-readable storage medium storing thereon a program for causing a computer to implement the method according to claim 9.

\* \* \* \* \*